(12) United States Patent
Yoshikawa

(10) Patent No.: US 10,746,399 B2
(45) Date of Patent: Aug. 18, 2020

(54) COMBUSTION SYSTEM

(71) Applicant: GGI HOLDINGS LIMITED, Douglas, Isle of Man (GB)

(72) Inventor: Naoya Yoshikawa, Tokyo (JP)

(*) Notice: Subject to any disclaimer, the term of this patent is extended or adjusted under 35 U.S.C. 154(b) by 967 days.

(21) Appl. No.: 14/901,574

(22) PCT Filed: Jun. 25, 2013

(86) PCT No.: PCT/JP2013/067964
§ 371 (c)(1),
(2) Date: Dec. 28, 2015

(87) PCT Pub. No.: WO2014/207944
PCT Pub. Date: Dec. 31, 2014

(65) Prior Publication Data
US 2016/0195269 A1 Jul. 7, 2016

(51) Int. Cl.
*F01K 3/00* (2006.01)
*F23G 5/12* (2006.01)
(Continued)

(52) U.S. Cl.
CPC .................. *F23G 5/12* (2013.01); *F01K 5/02* (2013.01); *F23G 5/085* (2013.01); *F23G 7/001* (2013.01);
(Continued)

(58) Field of Classification Search
CPC ............ F23L 7/005; F23L 7/007; F23G 5/085
(Continued)

(56) References Cited

U.S. PATENT DOCUMENTS 5,237,144 A * 8/1993 Iguchi .................. B24B 49/105
219/628
2005/0284864 A1* 12/2005 Yamada .................. H05B 6/26
219/651
(Continued)

FOREIGN PATENT DOCUMENTS

JP 2004155879 A * 6/2004
JP 2011178850 A * 9/2011
JP 2011257121 A * 12/2011

OTHER PUBLICATIONS

English translation of Japanese Patent Application Publication No. JP 2011-257121A (Year: 2011).*
(Continued)

*Primary Examiner* — Jason D Shanske
(74) *Attorney, Agent, or Firm* — Jordan Powell

(57) ABSTRACT

Provided is a combustion system, and in particular a thermal decomposition system and plasma melting system, with which superheated steam is generated in an energy-efficient manner and the combustion structure has an improved combustion efficiency. A combustion system for making hot water coming from a boiler (11) into superheated steam with a superheated steam generation device (20) and supplying the superheated steam to a combustion structure (50) is provided with the following: the combustion structure (50) which combusts a fuel and a carbonaceous solid at 350 to 1,000° C.; a heat storage device (70) for storing waste heat from the combustion structure; and a heat exchange water tank (12) that is connected so as to allow heat exchange, through a heat transport medium, with heat from the heat storage device (70), and that heats water that is supplied to the boiler (11). The combustion system is provided with an oxyhydrogen gas supply structure (40) for heating the water supplied to the boiler (11) and also supplying an oxygen/hydrogen mixed gas, and a mixer (30) for mixing the
(Continued)

superheated steam generated with the superheated steam generation device (20) and the oxygen/hydrogen mixed gas from the oxyhydrogen gas supply structure (40). The superheated steam is mixed with the oxyhydrogen gas and supplied to the combustion structure (50).

8 Claims, 7 Drawing Sheets

(51) Int. Cl.
- *F23G 7/00* (2006.01)
- *F23G 5/08* (2006.01)
- *F23L 7/00* (2006.01)
- *F23G 7/12* (2006.01)
- *F23G 7/10* (2006.01)
- *F01K 5/02* (2006.01)

(52) U.S. Cl.
CPC ............... *F23G 7/10* (2013.01); *F23G 7/12* (2013.01); *F23L 7/005* (2013.01); *F23L 7/007* (2013.01); *F23C 2900/9901* (2013.01); *F23C 2900/99011* (2013.01); *F23G 2204/201* (2013.01); *F23G 2206/203* (2013.01); *Y02E 20/12* (2013.01); *Y02E 20/344* (2013.01)

(58) Field of Classification Search
USPC ............................................. 60/659
See application file for complete search history.

(56) References Cited

U.S. PATENT DOCUMENTS

2013/0081403 A1* 4/2013 Hansson ............... F01K 13/00
                                                                    60/781
2013/0125798 A1* 5/2013 Taylor ..................... F23C 9/00
                                                                   110/205

OTHER PUBLICATIONS

English translation of Japanese Patent Application Publication No. JP 2004-155879A (Year: 2004).*

English translation of Japanese Patent Application Publication No. JP 2011-178850A (Year: 2011).*

* cited by examiner (a)

(b)

(c)

COMBUSTION SYSTEM

CLAIM OF PRIORITY

This application claims the benefit of priority to PCT/JP2013/067964, filed Jun. 25, 2013, entitled "COMBUSTION SYSTEM," which is incorporated herein by reference in its entirety.

TECHNICAL FIELD

The invention relates to a combustion system. More specifically the invention relates to a combustion system using overheated steam.

BACKGROUND ARTS

In a combustion system where a combustion device, for example, a pyrolysis furnace is used to pyrolyze waste or such to obtain an oil, superheated steam is used as an auxiliary heat source.

For example, a first known method uses a process for regenerating waste comprising charging waste into a carbonizing and gasifying furnace downwardly inclined together with superheated steam from the inlet side to the outlet side and pyrolyzing and carbonizing the waste without causing combustion by indirectly heating the waste in a state blocked from air by an electric heater in the carbonizing and gasifying furnace and at the same time, the amount of deposition of the carbonized material in the furnace being increased toward the outlet side and water-gas-shift reaction being caused by the heat to produce a dry distillation gas mainly containing hydrogen and carbon monoxide, and converting the dry distillation gas to liquid fuels by using a Fischer-Tropsch catalyst in order to provide a waste regeneration method and a waste regeneration system for small-to-medium-sized facilities, capable of efficiently and simply carrying out gasification and gas reforming of solid waste simultaneously with carbonization of the wastes m one furnace and capable of readily controlling calorie and stably carrying out gasification and efficiently regenerating a carbonized material, a useful gas and a liquid fuel even if the apparatus is small-scale.

Superheated steam, which is generally produced by heating water to about 100° C. by a boiler, and then further superheating the boiled water to a prescribed temperature by a super heater, is send as a high temperature gas to a pyrolyzer, which is a combustion device, to be used as a carrier gas or an auxiliary heat means.

At this time, a boiler utilizing an oil such as heavy oil as a heat source or an electrical heating boiler is used as a boiler.

In this case, water supplied from a water source having a normal room temperature is heated to about 100° C. by consuming a considerable amount of energy.

In order to lower a temperature of high-temperature exhaust gas within a limit of the heat resistance of a latent heat recovery heat exchanger formed of titanium without using a heat exchanger for a high temperature while effectively utilizing the sensible heat of the high-temperature exhaust gas, a second known method discloses that the high-temperature exhaust gas is sprinkled at an inlet side or an outlet side of the latent heat recovery heat exchanger, the sprinkled water is heated by the heat of the exhaust gas to be water vapor, and the gas temperature is lowered. The water vapor generated by sprinkling water is condensed together with the original water vapor of the exhaust gas by taking advantage of characteristics of a latent heat recovery device. The increased condensation latent heat is also utilized for water supply to a boiler, for example, as high-temperature water.

However, the system disclosed in the first known method referenced above requires a large amount of energy to produce superheated steam, deducting the resulting oil from total energy, the energy amount rather becomes minus.

The technology disclosed in the second known method referenced above utilizes several hundred ° C., and the efficiency of this technology is not so high.

Particularly, in the case of combustion system where several tons of waste is daily liquefied, it is required to several hundreds litter of water at a normal temperature is boiled per hour and there is a disadvantage that a required amount of boiled water can be supplied to a super heater only by consuming a huge amount of energy.

SUMMARY OF THE INVENTION

Problems Solved by the Invention

An object of the invention is, therefore, to provide a combustion system, and in particular a pyrolysis system and plasma gasification system, with which superheated steam is generated in an energy-efficient manner and the combustion structure has an improved combustion efficiency.

Means for Solving Problems

The present invention, which solves the above object, relates to the following Items.

1. A combustion system, which produces superheated steam by a super heating device from a hot water from a boiler to be supplied to the combustion system, said combustion system comprising:

a combustion structure which combusts a fuel and a solid carbonaceous substance at a temperature of from 350 to 1,000° C., a heat storage device for storing waste heat from the combustion structure; and a heat exchange water tank connected so as to allow heat exchange, through a heat transport medium, with heat from the heat storage device, and that heats water supplied to the boiler, said combustion system further comprising an oxyhydrogen gas supply structure for heating the water supplied to the boiler and also supplying an oxygen/hydrogen mixed gas, and a mixer for mixing the superheated steam generated with the superheated steam generation device and the oxygen/hydrogen mixed gas from the oxyhydrogen gas supply structure, so that superheated steam is mixed with the oxyhydrogen gas and supplied to the combustion structure.

2. The combustion system according to Item 1, wherein said heat storage device is composed of a heat collecting furnace which captures the exhaust heat from the combustion system via a pipe, and a heat exchange pipe filled with a heat transport medium for transporting heat collected by the heat collecting furnace.

3. The combustion system according to Item 1, wherein the steam from the boiler is superheated in a pipe routed through the heat storage device and enters enter into the superheated steam generation device.

4. The combustion system according to Item 1, wherein said combustion system is a liquefaction furnace.

5. The combustion system according to Item 4, which possesses a crude oil refinery system comprising:

a first refinery comprising
an inlet for introducing superheated steam containing oxygen/hydrogen gas from the mixer into the downstream of the liquefaction furnace as a carrier gas, a heating means for heating crude hydrocarbon, a separating means for separating the crude hydrocarbon into gaseous component and liquid component, a gas outlet for discharging the separated gaseous component, a liquid outlet for discharging the separated liquid component;
a latter refinery unit which purifies the liquid discharged from the liquid outlet of the first refinery; and
an oil storage tank which collects and stores the purified oil.

6. The combustion system according to Item 1, wherein said combustion structure comprises a plasma gasification furnace.

7. The combustion system according to Item 1, wherein said solid carbonaceous substance comprises biomass material or sludge.

8. The combustion system according to Item 1, wherein said heat storage device possesses a power generation system as a secondary side.

9. The combustion system according to Item 8, wherein said power generation system is mainly composed of a piston motor, a cooler and a circulation passage for a circulation gas circulated between the head storage device, the piston motor and the cooler, so that the pressure of the circulation gas pressurized by the heat of the heat storage device is converted into torque by means of the piston motor whereby the power generator generates electricity due to the torque.

10. The combustion system according to Item 8, wherein said power generation system is a screw type power generation system or a Stirling engine type power generation system.

11. The combustion system according to Item 1, wherein said superheated steam generation device comprises two or more superheat steam generation devices connected in series, and a screw type power generation system or a Stirling engine type power generation system is provided between said steam generation devices.

12. A combustion system, which produces superheated steam by a super heating device from a hot water from a boiler to be supplied to the combustion system, said combustion system comprising:

a combustion structure which combusts a fuel and a solid carbonaceous substance at a temperature of from 350 to 1,000° C., a heat storage device for storing waste heat from the combustion structure; and a heat exchange water tank connected so as to allow heat exchange, through a heat transport medium, with heat from the heat storage device, and that heats water that is supplied to the boiler.

Effect of the Invention

According to the combustion system of the present invention, superheated steam is used as an auxiliary and a carrier gas when a solid carbonaceous substance, which is a burning material, is combusted. In this case, the exhaust heat from the combustion structure is stored in the heat storage device, and always warms water at a normal temperature, which is the water source for superheat steam. Consequently, the combustion system of the present invention can effectively generate superheat steam, making it possible to generate a stable amount of superheat steam from a huge amount of water at a normal temperature. Since superheated steam is supplied to the combustion structure mixed together with oxyhydrogen gas in the combustion system of the present invention, the interior of the combustion structure can be kept at a high temperature in an efficient manner.

According to a preferred embodiment of the present invention, the combustion system of the present invention makes up a liquefaction device which recovers an oil from a solid carbonaceous substance. In this case, even if a solid carbonaceous substance having a low hydrogen content, due to the action of hydrogen contained in the superheated steam, an oil can be recovered with high yield.

According to another preferred embodiment of the present invention, a power generation system is connected with the heat storage device of the combustion system of the present invention. For this reason, electric power can be stably generated with high efficiency by utilizing the exhaust heat from the combustion structure.

EMBODIMENTS FOR CARRYING OUT THE INVENTION

Embodiments of the present invention will now be described by referring to the attached drawings.

The term "combustion system" used herein should be interpreted to include a pyrolysis device which pyrolyzes solid carbonaceous substance (municipal solid waste, exhaust plastic, sludge, biomass material or such) to be liquefied or carbonized, and an incineration or fusion system for these solid carbonaceous substance (e.g., plasma gasification system).

(Outline)

Figure 1:
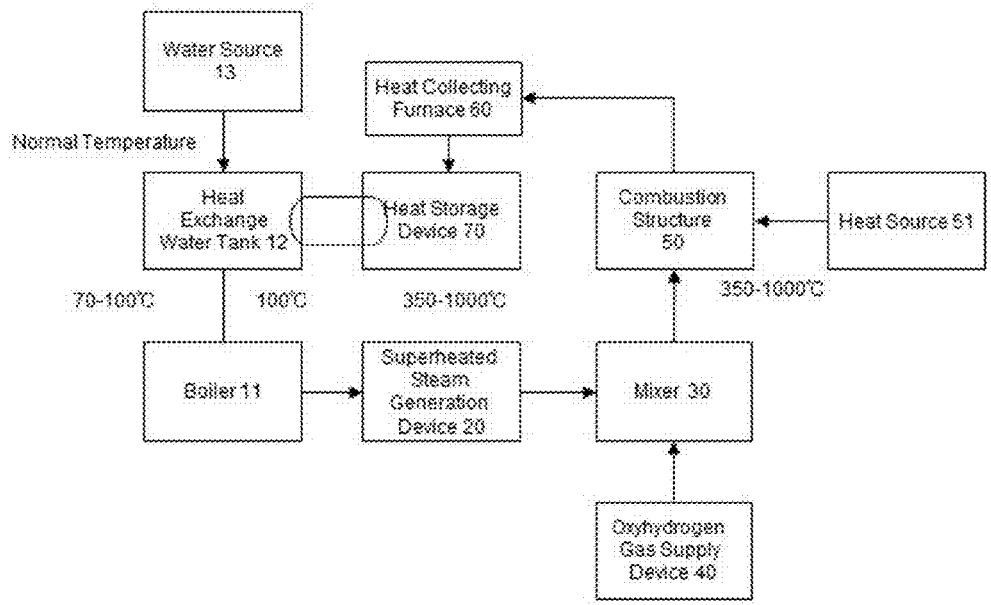
FIG. 1 is a schematic view showing an outline of the combustion system according to the present invention.

As shown in FIG. 1, the combustion system of the present invention makes hot water coming from a boiler 11 into superheated steam with a superheated steam generation device 20 and supplying the superheated steam to combustion structure 50. The combustion system of the present invention is mainly composed of combustion structure 50 which combusts a fuel and a carbonaceous solid at 350 to 1,000° C.; a heat storage device 70 for storing waste heat from the combustion structure; and a heat exchange water tank 12 connected so as to allow heat exchange, through a heat transport medium, with heat from the heat storage device 70, that heats water that is supplied to the boiler 11.

The exhaust heat exhausted from the combustion structure 50 is stored in heat storage device 70, and the stored heat warms water at normal temperature from a water source 13 in a heat exchange water tank 12 (for example, (70° C. to 100° C., preferably 70° C. to 98° C.).

The hot water heated at the heat exchange water tank 12 is further heated at boiler 11 and then supplied to superheated steam generation device 20.

Consequently, in contrast to the case where water is always heated by the boiler 11 in a required amount, in the present invention, the boiler 11 is not so loaded and energy consumption amount is drastically decreased, indicating that only a small amount of energy is required in comparison with the conventional latent heat type boiler.

Figure 2:
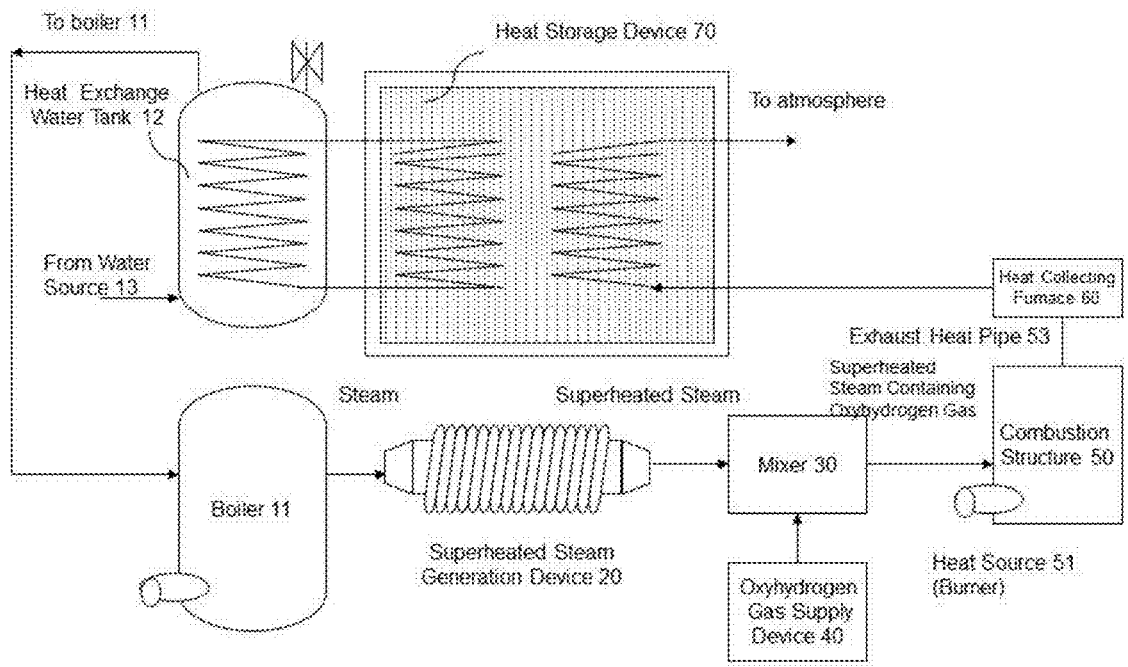
FIG. 2 shows one embodiment of the combustion system according to the present invention.

In the heat storage device 70 to be used in the combustion system of the present invention, as shown in FIG. 2, the heat from the combustion structure 50 may be stored via a heat collecting furnace 60. The heat collecting furnace 60 intended herein may be a block composed of diatomaceous earth. The exhaust heat from the combustion structure 50 is passed through an exhaust heat pipe 53 composed of a pipe having a large contact area in a tortuous form, at which the heat is collected, and is then vented to atmosphere.

The heat captured by the heat collecting furnace 60 is transferred from the heat collecting furnace 60 to the heat storage tank 70 via heat transfer medium and is then stored in the heat storage tank 70.

The heat storage material used in the heat storage tank 70 may be a mineral oil having a high specific heat which stores heat ranging from 200 to 400° C. (e.g., oil disclosed in JPA2011-257121). Such an oil can also be used as the heat transfer medium which transfers the heat collected in the heat collecting furnace 60 to the heat storage device 70.

Figure 3:
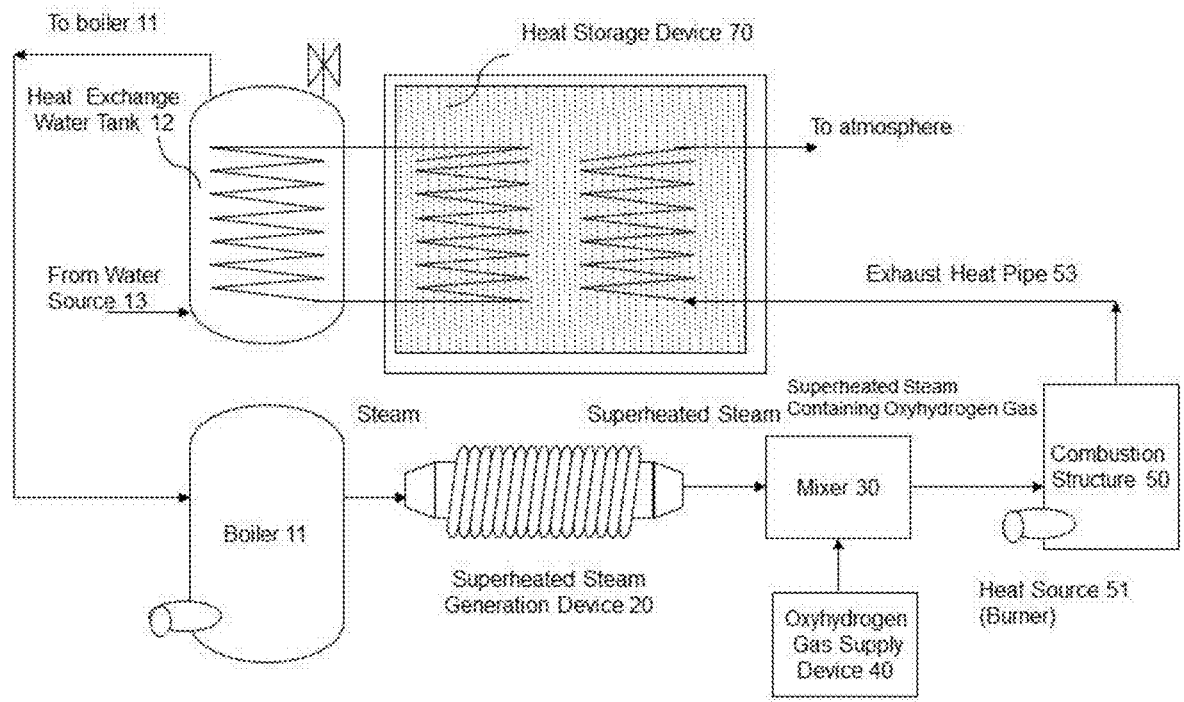
FIG. 3 shows another embodiment of the combustion system according to the present invention.

As shown in FIG. 3, the heat storage device 70 may be configured so that the exhaust heat from the combustion structure 50 is passed through a pipe in a tortuous form provided with the heat storage device 70 for storing the heat.

As described above, a huge amount of heat from the combustion structure 50 may be stored in the heat storage device 70 as shown in FIG. 2 and FIG. 3. By heat-exchange between the heat stored as described above and the heat exchange water tank 12, water at a normal temperature from the water source 13 can be warmed up to a prescribed temperature. In a preferred embodiment of the present invention, a heat transfer medium similar to that used in the heat exchange between the heat collecting furnace 60 and the heat storage device 70 is used in the heat exchange between the heat storage device 70 and the heat exchange tank 12.

The hot water (70° C. to 100° C.) having been warmed up in the heat exchange tank 12 is boiled in the boiler 11, is supplied to the superheated steam generation device 20, at which the water is heated to a prescribed temperature, e.g., 350° C. to 1,000° C., preferably 500° C. to 1,000° C. Thereafter the water is supplied to the later mixer 30 at a prescribed pressure.

The superheated steam generation device 20 to be used in the present invention may be suitably selected from the devices well-known in the art, and preference is given to use an inverter type superheated steam generation device having an induction heater provided on a steam pipe as shown in FIG. 2 and FIG. 3.

Figure 4:
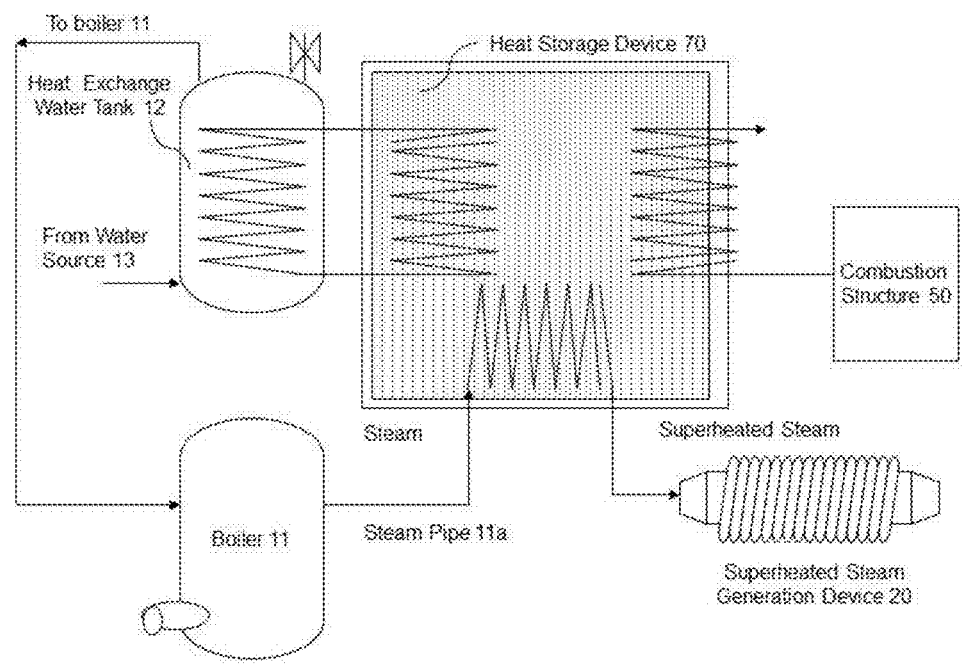
FIG. 4 shows still another embodiment of the combustion system according to the present invention.

As shown in FIG. 4, the super-heated steam can be produced by previously superheating the steam from the boiler 11 and then introducing the steam into the superheated steam generation device 20.

The superheated steam having a prescribed temperature e.g., 350° C. to 1,000° C., preferably 500° C. to 1,000° C. having been supplied to the latter mixer 30 at a prescribed temperature is mixed with oxyhydrogen gas from the oxyhydrogen gas supply source, and then supplied to the combustion structure 50.

Figure 5:
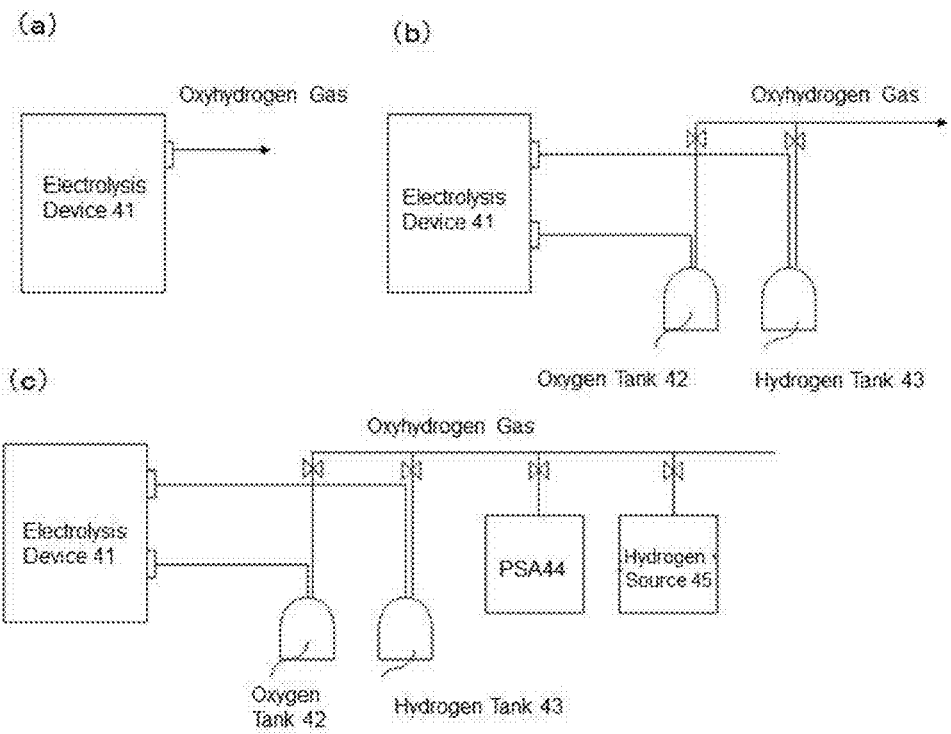
FIG. 5(*a*) to FIG. 5(*c*) each shows an embodiment of oxyhydrogen gas supply source used in the combustion system of the present invention.
Figure 6:
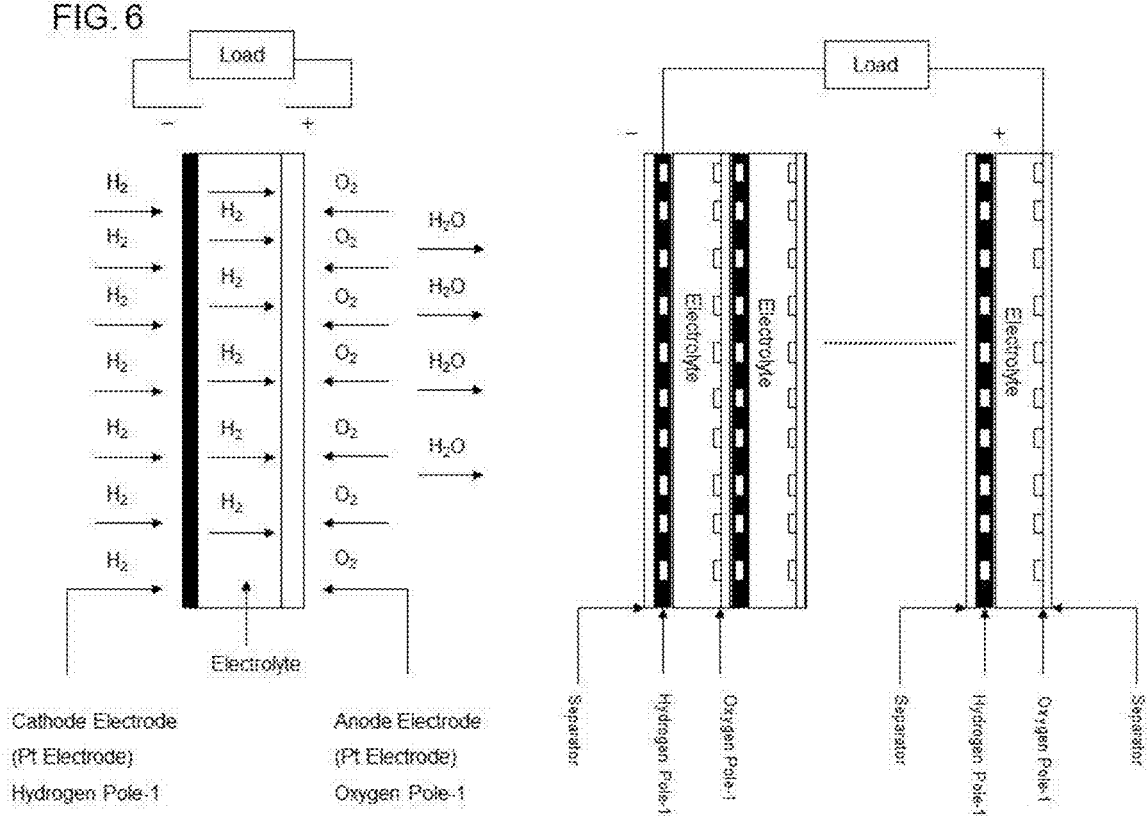
FIG. 6 shows a configuration of an electrolysis device used in FIG. 5.

As shown in FIG. 5 and FIG. 6, the oxyhydrogen gas supply device 50 as the oxyhydrogen gas supply source is mainly composed of an electrolysis device 41 for electrolyzing water.

The electrolysis device 41 is a known device that an anode and a cathode are immersed in a water (an aqueous electrolytic solution), and a prescribed load is applied to separate water into oxygen and hydrogen (normally oxygen:hydrogen=1:2).

Although oxygen and hydrogen generated may be supplied to the mixer 30 for example as shown in FIG. 5(a), oxygen and hydrogen can also be supplied to the mixer 30 in a manner that oxygen and hydrogen are previously stored in an oxygen tank 42 and a hydrogen tank 43 as shown in FIG. 5(b), and these stored oxygen and hydrogen are separately mixed to be supplied to the mixer 30. Furthermore, as shown in FIG. 5(c), in addition to the separately stored oxygen and hydrogen, oxygen from PSA 44, which is an oxygen concentration device, and hydrogen from hydrogen supply source 45 such as a hydrogen compressed gas cylinder may be separately added to supply the mixer 30.

In the present invention, the oxyhydrogen gas is supplied to the combustion structure 50 via the mixer 30, whereby the temperature within the combustion structure 50 can becomes rapidly uniform. When the carbonaceous substance, which is processing material, is incorporated, the temperature within the combustion structure is decreased whereby the heat distribution becomes uneven as a rule. According to the present invention, by incorporating a prescribed amount of the oxyhydrogen gas at this time, such a gas acts as a combustion improver to keep the interior of the temperature at uniform.

The mixing ratio of oxygen to hydrogen in the oxyhydrogen gas supply device 40 (molar ratio: the same applies hereinafter) is generally 1:2, and an amount of hydrogen may be excess (usually from 1:4 to 1:5) in order to prevent generation of oxidative flame.

The oxyhydrogen gas burns spontaneously when it becomes near the explosion point. A mixed gas of oxygen and hydrogen in a ratio of 2:1 called oxyhydrogen detonation gas has an explosion point of approximately 570° C. at a normal pressure. A minimum energy of spark required for igniting such a mixed gas is about 20 microjoule (mJ). Under the conditions of a normal temperature and a normal pressure, the oxyhydrogen gas is combustible when hydrogen volume occupies 4 to 95% of the total volume.

When being ignited, oxyhydrogen gas is converted into steam and the reaction is maintained by its exothermal reaction. 241.8 kJ of an energy (low calorific value) is generated by burning 1 mole of hydrogen. Although the amount of thermal energy generated does not have an influence upon the combustion manner, the temperature of flame is changed. When the proportion of oxygen and hydrogen is controlled in a precise manner, the temperature of the flame becomes up to 2800° C., which is 700° C. higher than the temperature when hydrogen gas is combusted in an atmosphere. If the mixed ratio is not 2:1 or if the gas contains an inert gas such as nitrogen, the temperature becomes lower due to the diffusion of heat to a larger volume.

For example, when the combustion structure 50 of the present invention is a pyrolyzer, the ratio of oxygen to hydrogen is not constant because the composition of the processing material such as waste is not constant. Consequently, in a preferred embodiment of the present invention, addition of oxygen and hydrogen is controlled so as to approach ratio of oxygen to hydrogen to be 2:1.

The adjustment of the ratio of oxygen to hydrogen may be carried out, for example, by separately adding oxygen gas and hydrogen gas, mixing them in a prescribed mixing ratio, and then adding the mixed gas to the pyrolysis device 30, as shown in FIG. 5(*b*), and preferably shown in FIG. 5(*c*).

It is important for approaching the mixing ratio of oxygen to hydrogen to be 2:1 to monitor the temperature within the combustion structure 50 (temperature distribution). It is preferred for monitoring the temperature to provide thermometers (not shown) on suitable places of the pyrolyzer 30. Examples of the thermometer to be used herein include infrared high camera for measuring high temperature, thermocouple, and particularly metal carbide thermocouple. They can monitor the temperature within the combustion structure.

In addition to the mixing ratio of oxygen to hydrogen, the amount of the oxyhydrogen gas to be supplied is also important factor. Specifically, if the amount of the oxyhydrogen gas to be supplied is unduly small, the effect of combustion improver of the oxyhydrogen gas is insufficient. Conversely, if it is too large, the consumption amount of the oxyhydrogen gas is wastefulness.

By changing the mixing ratio and the supply amount of the oxyhydrogen gas, particularly by incorporating the oxyhydrogen gas into the combustion structure 50 from the oxyhydrogen gas supply source 40 via the mixer 30, the temperature within the structure can be kept in a suitable manner to meet the change in the internal environment of the structure at the time of incorporating the processing substance.

The combustion system of the present invention configured as described above utilizes as an auxiliary and a carrier gas when a solid carbonaceous substance, which is a burning material, is combusted. In this case, the exhaust heat from the combustion structure is stored in the heat storage device, and always warms water at a normal temperature, which is the water source for superheated steam. Consequently, the combustion system of the present invention can effectively generate the superheated steam, making it possible to generate a stable amount of superheated steam from a huge amount of water at a normal temperature. Since superheated steam is supplied to the combustion structure mixed together with oxyhydrogen gas in the combustion system of the present invention, the interior of the combustion structure can be kept at a high temperature in an efficient manner.

The embodiments of the combustion system according to the present invention has been described, but the present invention is not restricted thereto. For example, the oxyhydrogen gas shown in FIG. 5 and FIG. 6 may be supplied in a line different from the superheated steam line. Also, no oxyhydrogen gas may be supplied.

Applied embodiments of the combustion system according to the present invention will now be described.

Figure 7:
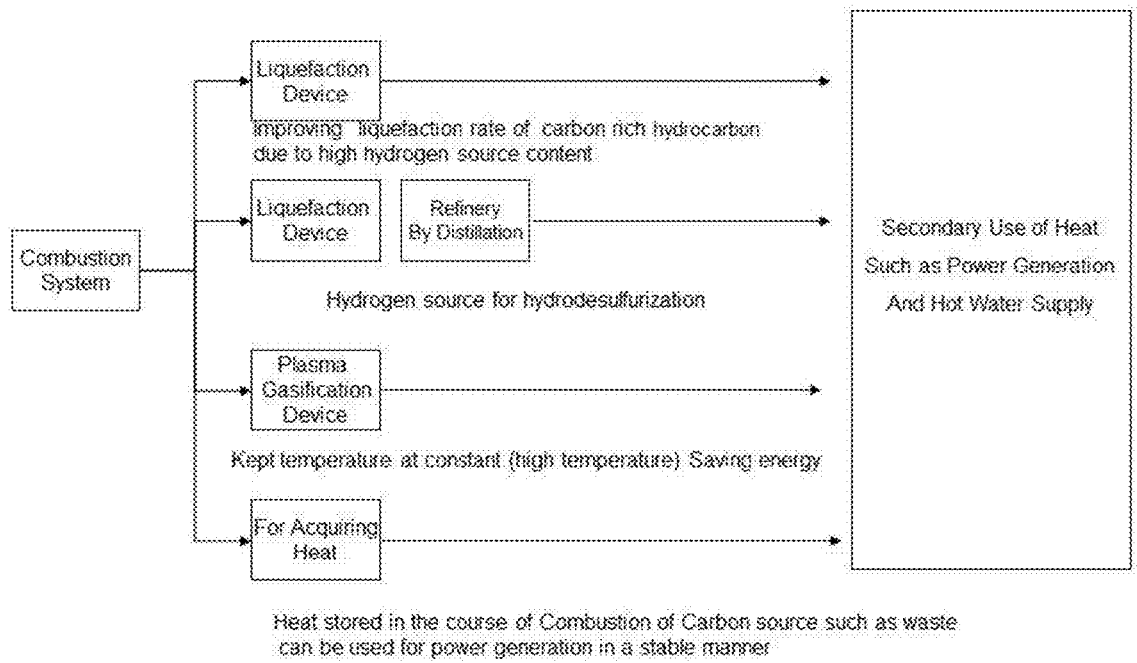
FIG. 7 is a schematic view showing the application of the combustion system according to the present invention.

The combustion system according to the present invention can be applied to various combustion system such as a pyrolyzer (liquefaction device, carbonization device etc.), a plasma gasification device, and any other combustion devices utilizing induction heat (see FIG. 7).

In a preferred embodiment of the present invention, there are provided, a power generation system, a hot water supply system and a cogeneration system where the heat stored in the combustion system of the present invention is effectively utilized.

These applied embodiment will be described.

Applied Embodiment 1A: Pyrolyzer

Figure 8:
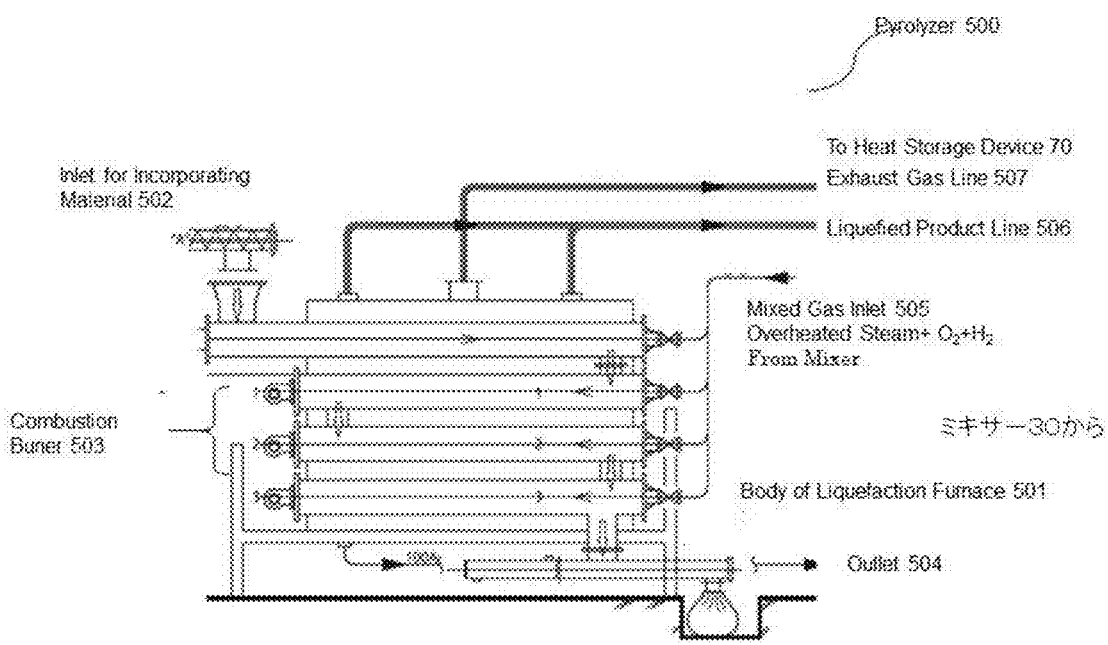
FIG. 8 shows an embodiment that the combustion system according to the present invention is applied to a liquefaction system.

In a preferred embodiment of the present invention, the combustion system may be a pyrolyzer (pyrolysis device) 500 as shown in FIG. 8.

The pyrolyzer device 500 is known as a device for pyrolyzing (thermally decomposing) a carbonaceous substance such as wastes such as municipal solid waste (MSW) and sludge, algae, wood to be liquefied or carbonized.

In the present invention, the combustion system may be applied to such a pyrolyzer 500.

The pyrolyzer 500 shown in FIG. 8 is a device for pyrolyzing the carbonaceous substance at a temperature not less than 500° C., preferably at about 1,000° C., to be gasified, and is mainly composed of a body of pyrolysis furnace 501, an inlet 502 for incorporating a carbonaceous substance, a burner 503 for heating the interior of the pyrolysis furnace 501, an outlet 504 for discharging the pyrolysis residue, a mixed gas inlet 505 for supplying superheated steam admixed with oxyhydrogen gas from the mixer 30 (see FIG. 1 to FIG. 6), a liquefied product line 506 which transfers the pyrolyzed gas, and an exhaust gas line 507, which discharges the exhaust gas to the side of the heat storage device (see FIG. to FIG. 6).

In the pyrolyzer 500 thus configured, a mixed gas mainly composed of superheated steam having a high temperature (for example, 950° C.) is supplied to the mixer 30.

Consequently, a calorie required for heating the carbonaceous material by the burner 503 can be saved. Also, when a carbonaceous substance having a large proportion of carbon in carbon:hydrogen ratio (for example, paper) is pyrolyzed, a liquefaction efficiency can be increased due to the hydrogen component contained in the oxyhydrogen, and an amount of CO, which is a synthesis gas component, can also be increased due to the reaction between carbon in the carbonaceous component and oxygen. The synthesis gas which can be recycled and used as a fuel is useful for saving energy required for the pyrolysis.

Figure 9:
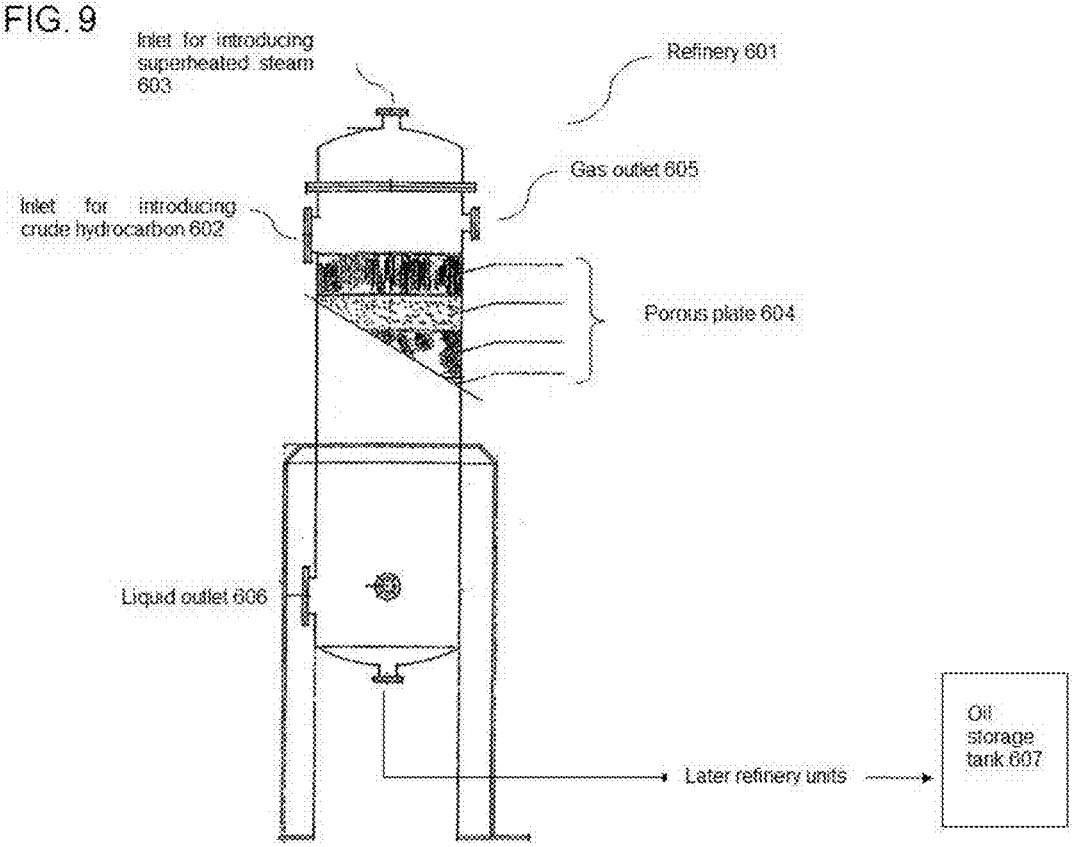
FIG. 9 shows one embodiment of a purification system of the liquefaction system shown in FIG. 8.
Figure 10:
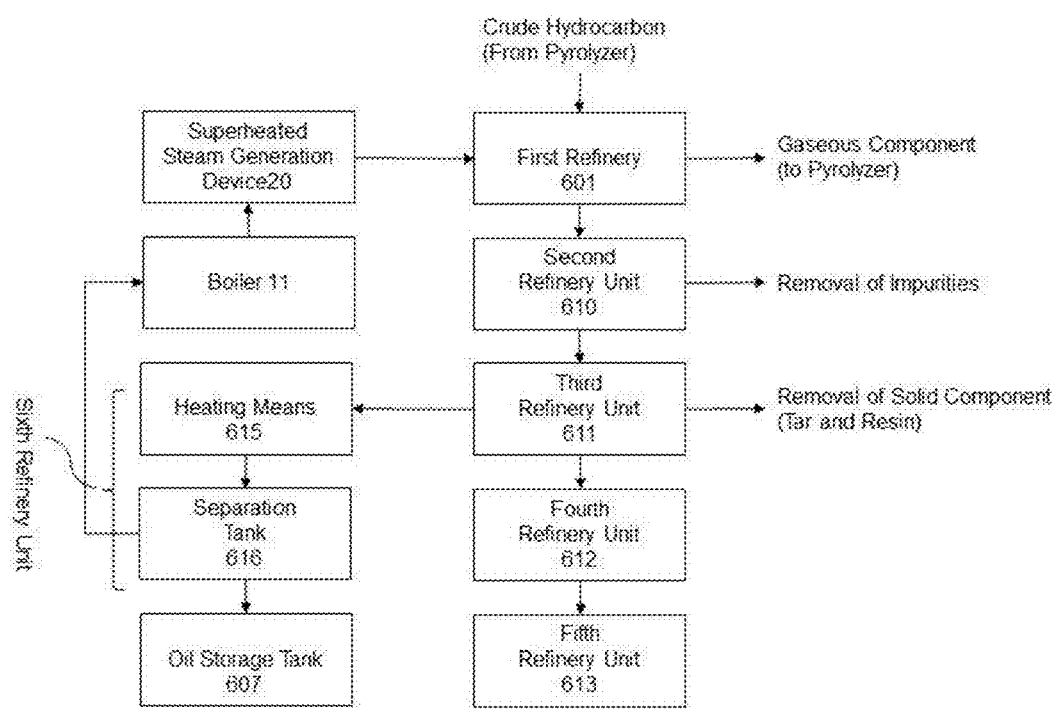
FIG. 10 shows another embodiment of t a purification system of the liquefaction system shown in FIG. 8.

In a specific embodiment of the present invention, as shown in FIG. 9 and FIG. 10, the hydrocarbon gas generated by the pyrolysis is preferably purified in a refinery. The refinery shown in FIG. 9 is an example of a device which purifies the hydrocarbon gas generated by the pyrolysis by distillation, and is a system where the crude hydrocarbon gas generated by the pyrolysis is purified to recover hydrocarbon having a prescribed range (molecular weight range).

The refinery 601 possesses a first refinery, later refinery units 610-616, which purifies the liquid exhausted from the liquid outlet of the first refinery 601, and an oil storage tank 607, shown in FIG. 10. The first refinery comprising a crude hydrocarbon inlet 602 which introduces the cured hydrocarbon exhausted from the pyrolysis; a superheated steam inlet 603 which introduces the superheated steam containing the oxyhydrogen gas from the mixer as a carrier gas (also serving as means for heating crude hydrocarbon); a porous plate 604 serving as separation means for separating the heated crude hydrocarbon into a hydrogen gas component and a liquid component; a gas outlet 605 for discharging the separated gas component, and a liquid outlet 606 for discharging the separated liquid component.

The heating temperature depends upon the oil to be purified and is generally from 350° C. to 600° C., preferably about 500° C. As occasion may demand, means for removing impurities (such as a filer or a catalyst) may be provided on an upstream of the gas/liquid separation means.

As described above, the crude hydrocarbon introduced from the pyrolyzer 500 is mixed with the oxyhydrogen gas introduced from inlet 603 for introducing superheated steam, and at the time of passing through a multiple porous plate 601 (four layers in the figure), the crude hydrocarbon is separated into component having a high specific gravity and gaseous component.

The gaseous component generally comprises a lower hydrocarbon, and is exhausted from the gas outlet 605, which is usually returned to the pyrolyzer 500 as a fuel source.

On the other hand, the separated liquid component is repeatedly purified in the later refinery units shown in FIG. 10, and then stored in the oil storage tanks as an oil component.

The crude hydrocarbon refinery system of the present invention purifies the crude oil exhausted from the pyrolyzer and recovered as a desired oil such as light oil kerosene grade oil, or diesel grade oil, and preference is given to provide the later refinery units as shown in FIG. 10 at the downstream of the first refinery.

The liquid component (crude hydrocarbon) resulting in gas/liquid separation by the first refinery is purified by the second to sixth refinery units 610-616 and is stored as a desired oil in the embodiment shown in FIG. 10.

The second refinery unit 610 is a device that removes impurities contained in the liquid component from the first refinery 601 by rapid filtration under pressurized/heated conditions. The pressurized/heated conditions, i.e., conditions for increasing flow rate may be suitably selected depending upon the viscosity and boiling point of the liquid component and the like and should not be restricted. It is also possible to directly store a desired oil in the oil storage tank 607 utilizing temperature difference.

The liquid (hydrocarbon) component having the impurities removed therefrom is then separated into a solid component, a gaseous component and a liquid component in the third refinery 611 (separation by difference in boiling points). The solid component comprises high molecular hydrocarbons generally called tar component or rein component, and is removed out.

The separated liquid component is then purified to a desired oil component in the fourth refinery unit 612 and the fifth refinery units 613, and recovered and stored in the oil storage tank 607. While two refinery units, i.e., the fourth refinery unit 612 and the fifth refinery unit 613, are used in this embodiment, the number of the refinery units are not restricted and one unit or three or more units may be used.

On the other hand, the gaseous component separated in the third refinery unit is a mixture of water with a lower hydrocarbon having a relatively small molecular weight, and is further separated into a water component and an oil component in the sixth refinery unit composed of heating means 615 and a separation tank 616 by the difference in boiling point.

The separated water component may be returned to the boiler 11 to be reused as superheated steam. On the other hand, the separated oil component is recovered and stored in the oil storage tank 607.

As described above, by providing the separator utilizing superheated steam, the device of the present invention can be effectively used.

Applied Embodiment 2 Plasma Gasification Device

Next, an embodiment will be described where the combustion system of the present invention is applied to a plasma gasification device.

Figure 11:
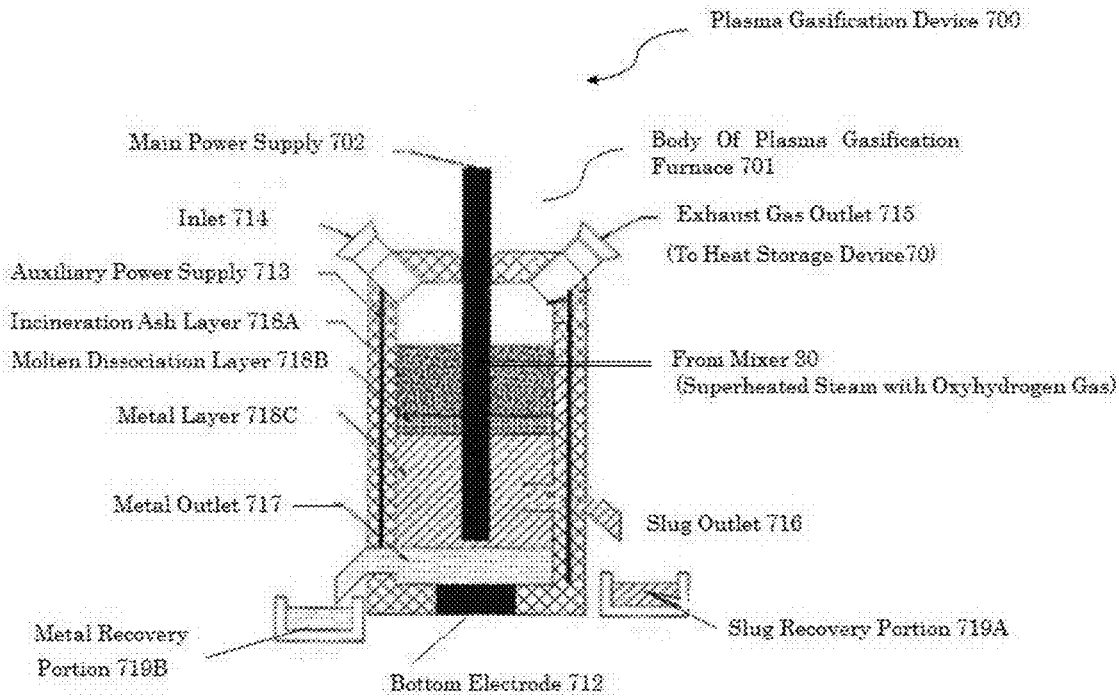
FIG. 11 shows an embodiment that the combustion system according to the present invention is applied to a plasma gasification device.
Figure 12:
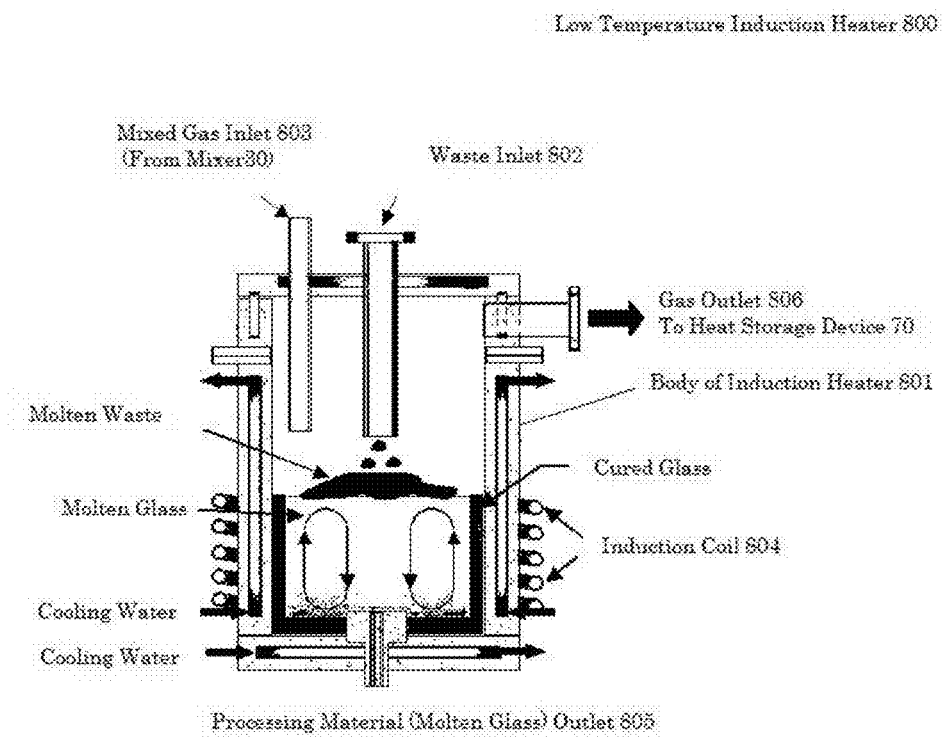
FIG. 12 shows an embodiment that the combustion system according to the present invention is applied to a low temperature induction heater.

As shown in FIG. 11, the plasma gasification device 700 of the present invention is mainly composed of a body 701 of plasma gasification furnace possessing an inlet 714 for intruding processing substance, a plasma torch 702 (main power supply), a bottom electrode 712 placed on a bottom portion corresponding to the position of the plasma torch, and an exhaust gas outlet 715; and a superheated steam inlet for introducing superheated steam containing oxyhydrogen into the body 701 of plasma gasification furnace.

The body 701 of plasma gasification furnace of the plasma gasification device 700 according to the present invention may be suitably selected from among the known of plasma gasification furnaces and not specifically restricted, and as shown in FIG. 11, an auxiliary power supply 713 is preferably provided on the wall of the body 701 of plasma gasification furnace.

The plasma gasification device 700 according to the present invention is configured so that the processing substance introduced from the inlet 702 is heated and molten by a high temperature plasma generated between the main power supply 701 and the bottom electrode 712. The molten processing substance is separated into an incineration ash layer 718A, a molten dissociation layer 718B, and a metal layer 718C, and is separately collected to a slug recovery portion 719A and a metal recovery portion 719B via a slug outlet 716 and a metal outlet 717.

In the plasma gasification device 700 of the present invention, high temperature superheated steam containing oxyhydrogen gas is introduced in the body 701 of plasma gasification furnace via the mixer 30 shown in FIG. 1 to FIG. 6.

In general, the temperature within the body 701 of plasma gasification furnace becomes high at a portion between the power supply 701 and the bottom electrode 712, and the temperature becomes lower toward the wall of the furnace. For this reason, it is very difficult to make the temperature distribution of the interior of the furnace uniform only by the provision of auxiliary power supply 713.

In this embodiment, the superheated steam containing oxyhydrogen gas is introduced in the body 701 of plasma gasification furnace, whereby the interior of the furnace can be rapidly kept at constant.

In this embodiment, at the time of incorporating the processing substance from the inlet 714, the temperature within the body 701 of plasma gasification furnace becomes uneven. When an adequate amount of the superheated steam containing the oxyhydrogen gas is introduced, the oxyhydrogen gas acts as a combustion improver and the temperature distribution within the furnace can become even without lowering the temperature due to the high temperature superheated steam.

The mixing ratio of oxygen to hydrogen in the oxyhydrogen gas supply device 40 (molar ratio: the same applies hereinafter) is generally 1:2, and an amount of hydrogen may be excess (usually from 1:4 to 1:5) in order to prevent generation of oxidative flame.

The oxyhydrogen gas burns spontaneously when it becomes near the explosion point. A mixed gas of oxygen and hydrogen in a ratio of 2:1 called oxyhydrogen detonation gas has an explosion point of approximately 570° C. at a normal pressure. A minimum energy of spark required for igniting such a mixed gas is about 20 microjoule (mJ). Under the conditions of a normal temperature and a normal pressure, the oxyhydrogen gas is combustible when hydrogen volume occupies 4 to 95% of the total volume.

When being ignited, oxyhydrogen gas is converted into steam and the reaction is maintained by its exothermal reaction. 241.8 kJ of an energy (low calorific value) is generated by burning 1 mole of hydrogen. Although the amount of thermal energy generated does not have an influence upon the combustion manner, the temperature of flame is changed. When the proportion of oxygen and hydrogen is controlled in a precise manner, the temperature of the flame becomes up to 2800° C., which is 700° C. higher than the temperature when hydrogen gas is combusted in an atmosphere. If the mixed ratio is not 2:1 or if the gas contains an inert gas such as nitrogen, the temperature becomes lower due to the diffusion of heat to a larger volume.

In the plasma gasification device 700, the ratio of oxygen to hydrogen is not constant because the composition of the processing material such as waste is not constant. Consequently, in a preferred embodiment of the present invention, addition of oxygen and hydrogen is controlled so as to approach ratio of oxygen to hydrogen to be 2:1.

It is important for approaching the mixing ratio of oxygen to hydrogen within the plasma gasification furnace 700 to be 2:1 to monitor the temperature within the plasma gasification furnace 700 (temperature distribution). It is preferred for monitoring the temperature to provide thermometers (not shown) on suitable places of the plasma gasification furnace 700. Examples of the thermometer to be used herein include infrared high camera for measuring high temperature, thermocouple, and particularly metal carbide thermocouple. They can monitor the temperature within the combustion structure.

In addition to the mixing ratio of oxygen to hydrogen, the amount of the oxyhydrogen gas to be supplied is also important factor. Specifically, if the amount of the oxyhydrogen gas to be supplied is unduly small, the effect of combustion improver of the oxyhydrogen gas is insufficient. Conversely, if it is too large, the consumption amount of the oxyhydrogen gas is wastefulness.

By changing the mixing ratio and the supply amount of the oxyhydrogen gas, particularly by incorporating the oxyhydrogen gas into the plasma gasification furnace 701 from the oxyhydrogen gas supply source 40 via the mixer 30, the temperature within the structure can be kept in a suitable manner to meet the change in the circumference of the structure at the time of incorporating the processing substance.

As described above, the plasma gasification device according to this embodiment can rapidly keep the temperature distribution at high to meet the change in the situation of the interior of the device and, thus, the processing amount relative to the volume of the device can be increased. For this reason, at the same inner volume, the processing amount of the plasma gasification device according to this embodiment can be increased, making it possible to miniaturization of the device. Also, since plasma gasification device according to this embodiment can rapidly keep the temperature distribution at high, the plasma gasification device according to this embodiment can be operated in a stable manner.

Consequently, the plasma gasification device according to the present invention can be suitably utilized for continuously introducing a processing substance or treating a waste having instable composition, and particularly treating so-called municipal solid waste.

What is more, the superheated steam used is based on the steam generated by storing the exhaust heat from the plasma gasification device having high calorific power and, thus, an energy consumed amount can be suppressed.

Applied Embodiment: Other Combustion System

In the combustion system according to the present invention, in addition to the pyrolyzer 500 and the plasma gasification device 700 described previously, it is also applicable to a low temperature induction heater 800 as shown in FIG. 11.

The low temperature induction heater 800 is an induction heater mainly composed of a body 801 of heat resistant induction heater, a waste inlet 802 for incorporating a slug from the slug outlet 716 of the plasma gamification device 700 provided on an upper side of the body 801, a mixed gas inlet 803 for introducing the superheated steam containing oxyhydrogen into the body 801 from the mixer (see FIG. 1 to FIG. 6) provided on an upper side of the body 801, an induction coil 704 for induction-heating the slug, and the processed substance outlet 705 for discharging the vitrified slug.

The heat exhausted is stored in the heat storage device 70 shown in FIG. 1 to FIG. 6.

Applied Embodiment 4 : Power Generation System

According to a preferred embodiment of the present invention, the heat generated at the combustion structure 50 and stored in the heat storage device 70 can be converted into electricity by the well-known power generation system, for example, screw type power generator and/or can be effectively utilized.

Figure 13:
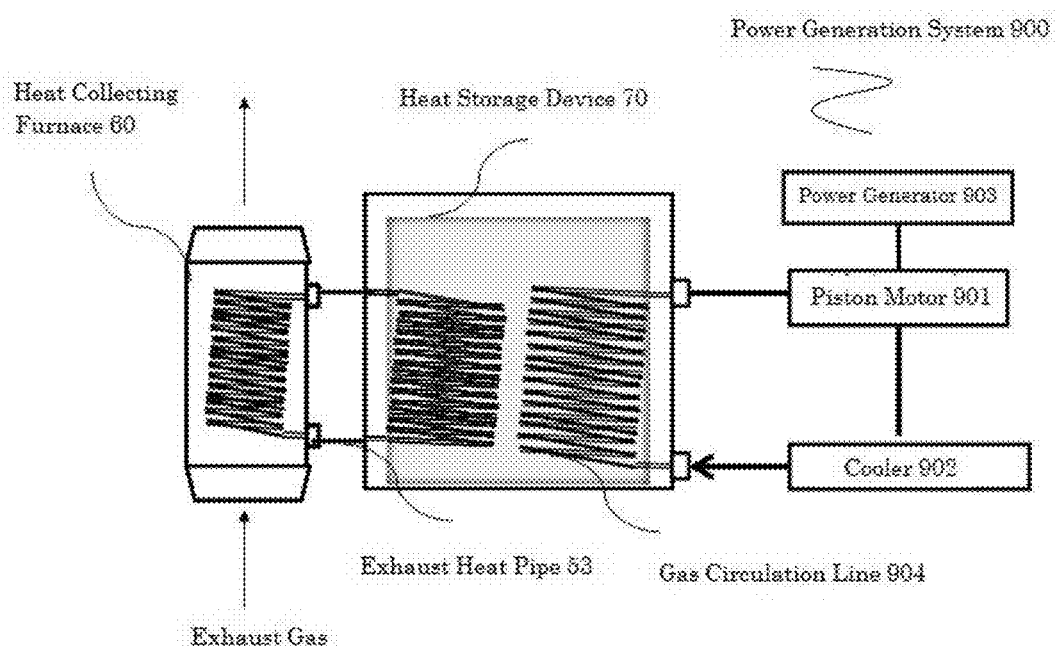
FIG. 13 shows one embodiment where a power generation system is incorporated in the combustion system according to the present invention.

As shown in FIG. 13, a power generation system may be composed of the heat collecting furnace 60, the heat storage device 70, the exhaust heat pipe 53, which transfers the heat between the heat collecting furnace 60, and the heat storage device 70, and a power generation system 900 which generates power by the use of the heat stored in the heat storage device 70.

The power generation system 900 is mainly composed of a piston motor 901, a cooler 902, a passage of circulation gas (gas having a high expansion coefficient) which circulate between them (gas circulation line 904), and a power generator 903, configured so that the pressure of the circulation gas thermally expanded (for example, 0.5 MPa) is converted into torque to actuate the power generator 903. It is preferably configured so that the rotation number is increased by providing an overdrive device (not shown) in-between the piston motor 901 and the power generator 903.

The circulation gas used for power generation as described above is cooled in the cooler 902 (for example, pressure decreased to 0.05 MPa) and returned to heat storage device 70 at which the circulation gas is heated again. The power generation system described above is a novel system operated by differential pressure of the circulation gas and, thus, the present invention is extended to such a power generation system.

Figure 14:
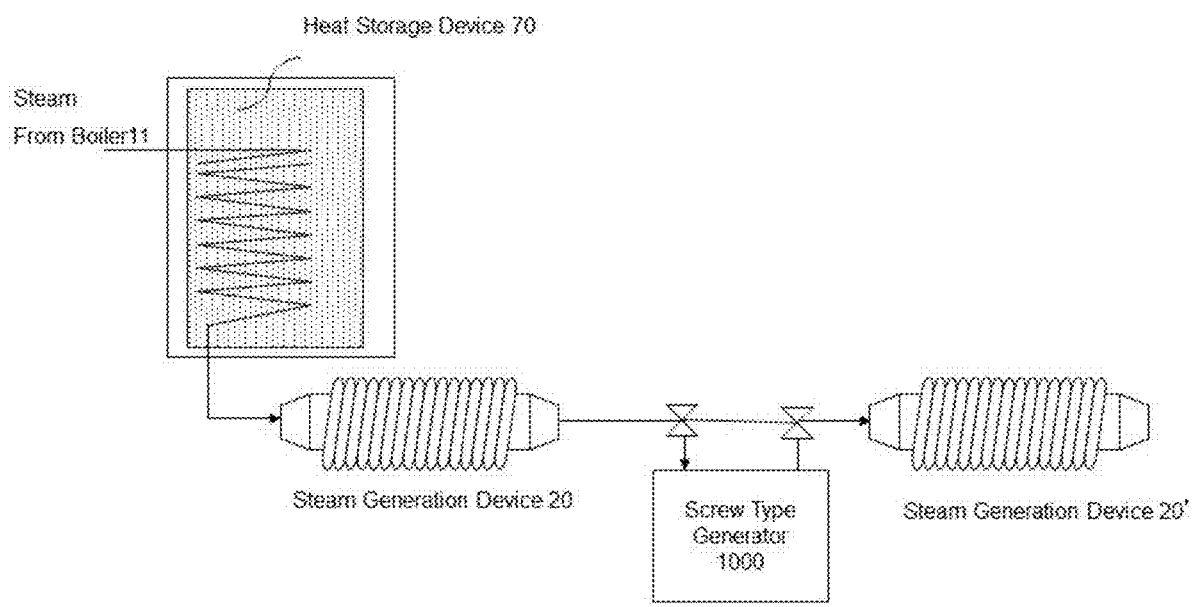
FIG. 14 shows another embodiment where a power generation system is incorporated in the combustion system according to the present invention.

As described in FIG. 14, it is also possible that a plurality of the superheated steam generation devices 20, 20' are provided in series, and a screw type power generator 1000 is placed in-between the superheated steam generation devices 20, 20' connected with a switching valve to generate power.

As described above, the combustion system according to the present invention which stores the heat from the combustion structure 50 in the heat storage device 70, can suppress the energy consumption amount for producing superheated steam, and can use the heat stored in the heat storage device.

Particularly, when an inexpensive carbonaceous substance (or earning substance) such as waste is combusted in the combustion system according to the present invention, a large amount of power can be provided.

INDUSTRIAL APPLICABILITY

According to the combustion system of the present invention, superheated steam is used as an auxiliary and a carrier gas when a solid carbonaceous substance, which is a burning material, is combusted. In this case, the exhaust heat from the combustion structure is stored in the heat storage device, and always warms water at a normal temperature, which is the water source for superheat steam. Consequently, the combustion system of the present invention can effectively generate superheat steam, making it possible to generate a stable amount of superheat steam from a huge amount of water at a normal temperature. Since superheated steam is supplied to the combustion structure mixed together with oxyhydrogen gas in the combustion system of the present invention, the interior of the combustion structure can be kept at a high temperature in an efficient manner.

According to a preferred embodiment of the present invention, the combustion system of the present invention makes up a liquefaction device which recovers an oil from a solid carbonaceous substance. In this case, even if a solid carbonaceous substance having a low hydrogen content, due to the action of hydrogen contained in the superheated steam, an oil can be recovered with high yield.

According to another preferred embodiment of the present invention, a power generation system is connected with the heat storage device of the combustion system of the present invention. For this reason, electric power can be stably generated with high efficiency by utilizing the exhaust heat from the combustion structure.

DESCRIPTION OF SYMBOLS

11 Boiler
12 Heat Storage Device
13 Water Source
20 Superheated Steam Generation Device
30 Mixer
40 Oxyhydrogen Gas Supply Structure
50 Combustion Structure
70 Heat Storage Device
500 Liquefaction Device
601 Crude Gas Refinery
700 Plasma Gasification Device
800 Low Temperature Induction Heater
900 Power Generation System

What is claimed is:

1. A combustion system, which produces superheated steam to be supplied to the combustion system, said combustion system comprising:
    a combustion structure coupled to a heat storage device, the combustion structure receiving a fuel and a solid carbonaceous substance and combusts the solid carbonaceous substance and the fuel at a temperature of from 350 to 1000° C.;
    waste heat from the combustion of the fuel and carbonaceous substance in the combustion structure is stored in the heat storage device;
    a heat exchange water tank connected to the heat storage device so as to allow heat exchange through a heat transport medium, wherein the waste heat from the heat storage device is exchanged into the heat exchange water tank through the heat transport medium and heats water in the heat exchange water tank which is then supplied to a boiler;
    the boiler receiving the heated water from heat exchange water tank and boiling the water, the boded water supplied from the boiler to a superheated steam generation device connected to the boiler where the boiled water is superheated into superheated steam;
    the superheated steam supplied to a mixer coupled to the superheated steam generation device, the mixer further connected to an oxyhydrogen gas supply source to receive from the oxyhydrogen gas supply source an oxygen/hydrogen mixed gas;
    the mixer connected to the combustion structure, wherein the mixer mixes the superheated steam and the oxygen/hydrogen mixed gas and supplies the mix to the combustion structure; and
    wherein the combustion system is a steam liquefaction furnace and the combustion structure comprises:
        a first refinery having an inlet allowing hydrocarbons into the first refinery;
        the first refinery connected to the mixer and receiving the mix from the mixer to be combusted with the hydrocarbons in the first refinery;
        a porous plate coupled to the first refinery, the combusted hydrocarbons separated into liquid and gas by passing through the porous plate;
        a latter refinery coupled to the porous plate receiving the liquid combusted hydrocarbons therefrom and purifying the liquid combusted hydrocarbons; and
        an oil storage tank connected to the latter refinery and collecting and storing the purified combusted liquid hydrocarbons.

2. The combustion system according to claim 1, wherein said heat storage device is composed of a heat collecting furnace which captures the exhaust heat from the combustion structure via a pipe, and a heat exchange pipe filled with a heat transport medium for transporting heat collected by the heat collecting furnace.

3. The combustion system according to claim 1, wherein said combustion structure further comprises a plasma gasification furnace.

4. The combustion system according to claim 1, wherein said solid carbonaceous substance comprises biomass material.

5. The combustion system according to claim 1, wherein said superheated steam generation device comprises two or more superheated steam generation devices connected in series, and a power generator k provided between each of said two or more superheated steam generation devices.

6. The combustion system according to claim 1 wherein the superheated steam generation device further comprises an induction heater coupled thereto.

7. The combustion system according to claim 1 wherein the heat transport medium includes a tortuous pipe.

8. The combustion system according to claim 1 wherein the solid carbonaceous substance comprises sludge.

* * * * *